UNITED STATES PATENT OFFICE.

BRUNO RICHARD SEIFERT, OF RADEBEUL, NEAR DRESDEN, GERMANY, ASSIGNOR, BY MESNE ASSIGNMENTS, TO THE FIRM OF E. MERCK, OF DARMSTADT, GERMANY.

MANUFACTURE OF NEW STABLE IODIN COMPOUNDS OF FATS.

No. 913,311.   Specification of Letters Patent.   Patented Feb. 23, 1909.

Application filed February 20, 1906. Serial No. 302,005.

*To all whom it may concern:*

Be it known that I, BRUNO RICHARD SEIFERT, a subject of the King of Saxony, and resident of Radebeul, near Dresden, Kingdom of Saxony, German Empire, have invented a new and useful Improvement in the Manufacture of New Stable Iodin Compounds of Fats, of which the following is a specification.

In the German Letters Patent 96,495 it is stated that the iodin compounds of fats prepared by iodizing in a complete manner are not stable, for which reason they cannot be used as articles of trade for therapeutic purposes.

Processes for the manufacture of stable chlorin-iodin compounds of fats and of stable iodin compounds of fats are described in the German Letters Patent 96,495; 135,835 and 159,748, and consist in the reaction of either chlorin-iodin or hydriodic acid, or iodin together with reducing agents on fatty substances in quantities insufficient for the formation of compounds iodized in the highest possible degree.

By the treatment of fats with chloroiodin or mixtures containing chloroiodin (such mixtures are for example those used in Huebl's method for determining the iodin figure of fats) in quantities sufficient for the formation of fats iodized in the highest possible degree, iodized compounds are obtained, which are not stable and which contain chlorin and iodin.

Up to the present the following facts were known: 1st, complete treatment of fats with chlorin-iodin yields chlorin-iodin fats not stable, not suitable for medicinal use. 2nd, complete treatment of fats with hydriodic acid or with iodin and reducing agents yields iodin fats, not stable, not suitable for medicinal use. 3rd, incomplete treatment of fats with chloroiodin yields stable chloroiodin fats, suitable for medicinal use. 4th, incomplete treatment of fats with hydroiodic acid or with iodin and reducing agents yields stable iodin fats, fit for medicinal use.

Now I have stated: A, complete treatment of fats of a low Huebl iodin figure with chlorin-iodin yields chlorin-iodin fats not stable, and, therefore, not suitable for medicinal use; this being the same result as stated above under 1. B, complete treatment of fats of a low Huebl iodin figure with pure iodizing agents, not containing any chlorin-iodin yield stable pure iodin fats, valuable for therapeutic purposes. This means a new technical effect, for up to the present it was impossible to obtain a stable iodin fat by complete iodizing. I obtain a stable iodin fat by complete iodizing when proceeding from a fat (like cocoa-butter) with a low Huebl iodin figure, and when iodizing such fats not with chloro-iodin but with other iodizing agents containing no chloro-iodin, for instance, iodin and iodic acid. The pure iodin fats thus obtained are remarkably suitable as therapeutic agents for the reason that they are stable for a long time and willingly taken and well digested on account of their agreeable taste.

*Example A.*—960 parts of cocoanut-oil are mixed at 50° centigrade with 400 parts of alcohol and a solution of 77 parts of iodin in 800 parts of alcohol. Into this mass a solution of 52.3 parts of iodic acid in 65 parts of water plus 60 parts of alcohol is stirred. After stirring for about one hour, the oil is separated from the iodizing solution, several times washed with alcohol at 30° centigrade and dried at moderate temperature, for example *in vacuo* at 45° centigrade. In this way, an iodin-cocoanut-oil is obtained as a white to slightly yellowish oil forming a crystalline fat on solidifying, of agreeable taste and of permanent stableness when protected against light. The product obtained according to the process described contains 5 per cent. of iodin. The "Huebl iodin figure" is naught, that of the coaconut-oil about nine.

*Example B.*—500 grams of cocoa-butter are agitated for one hour at about 60° centigrade with a solution of 175 grams of iodin in 1.25 liters of alcohol and a solution of 150 grams of iodic acid in 150 grams of water. After some hours the oil has re-aggregated, it is separated from the iodizing solution, decolorized to yellow by adding a solution of sulfite or bisulfite or another agent absorbing free iodin, afterwards well washed with water and alcohol and dried at about 50° centigrade. In this way iodin cocoa-butter is obtained as a white to slightly yellowish fat of agreeable taste and permanent stableness when protected against light. The "Huebl iodin figure" is naught.

What I claim is:

1. A process for the manufacture of an iodin fat from cocoabutter by first preparing an iodizing reagent by the admixture of solutions of iodin and iodic acid, in substantially the proportions specified, mixing therewith at an elevated temperature cocoabutter, permitting the mixture to stratify to separate the iodized cocoabutter.

2. As a new article of manufacture, iodin cocoabutter which has the Huebl iodin figure naught, is of ivory color, is stable when stored up, contains about 8.5 to 10 per cent. of iodin and has an agreeable taste.

In testimony that I claim the foregoing as my invention, I have signed my name in presence of two witnesses this sixth day of February 1906.

BRUNO RICHARD SEIFERT.

Witnesses:
PAUL E. SCHILLING,
PAUL ARRAS.